United States Patent [19]

Nakagawa et al.

[11] Patent Number: 5,073,820
[45] Date of Patent: Dec. 17, 1991

[54] IMAGE DATA CODING APPARATUS AND CODING METHOD

[75] Inventors: Chihiro Nakagawa; Hiroyuki Fukuda; Hiroshi Sasaki, all of Hachioji; Chikako Mogi; Hidetoshi Yamada, both of Tokyo, all of Japan

[73] Assignee: Olympus Optical Co., Ltd., Tokyo, Japan

[21] Appl. No.: 602,162

[22] Filed: Oct. 23, 1990

[30] Foreign Application Priority Data

Oct. 31, 1989 [JP] Japan .................... 1-283761
May 29, 1990 [JP] Japan .................... 2-137222

[51] Int. Cl.⁵ ..................... H04N 7/133; H04N 41/04
[52] U.S. Cl. ................................. 358/133; 358/13; 358/209
[58] Field of Search ............ 358/133, 135, 136, 13, 358/209

[56] References Cited

U.S. PATENT DOCUMENTS

4,386,373  5/1983  Kondo et al. .................... 358/431
4,780,761 10/1988  Daly et al. ...................... 358/133
4,982,282  1/1991  Saito ............................... 358/133

FOREIGN PATENT DOCUMENTS

0283715A2  2/1988  European Pat. Off. .
3111823A1  3/1982  Fed. Rep. of Germany .
3735349A1  4/1988  Fed. Rep. of Germany .
3800634A1  7/1988  Fed. Rep. of Germany .
3709094A2 10/1988  Fed. Rep. of Germany .
63-227272  9/1988  Japan .

OTHER PUBLICATIONS

IEEE Transactions on Communications, vol. Com.-32, No. 3, Mar. 1984; Chen & Pratt.
IEEE Transactions on Communications, vol. Com-25, No. 11, Nov. 1977, pp. 1285-1292, "Adaptive Coding of Monochrome and Color Images", Chen et al.
"Transformationen Zur dAtenkompression Von Grauwerbildern" Dipl. Phys. Steffen Mehnert, Bild Und Ton 40 (1987)9, pp. 261-268.
"Digital Still Video Camera Using Semiconductor Memory Card" F. Izawa, et al. IEEE Transactions on Consumer Electronics, vol. 36, No. 1, Feb. 1980, pp. 1-9.
"Performance of Block Cosine Image Coding with Adaptive Quantization", James W. Modestino, IEEE Transactions on Communications, vol. Com-33, No. 3, Mar. 1985, pp. 210-217.
"Image Data Compression: A Review", Anil K. Jain, Proceedings of the IEEE, vol. 69, Mar. 1981, pp. 349-384.

*Primary Examiner*—Howard W. Britton
*Attorney, Agent, or Firm*—Frishauf, Holtz, Goodman & Woodward

[57] ABSTRACT

An image data coding apparatus performs first and second coding processes. A controller outputs first and second control signals. An orthogonal transform circuit performs orthogonal transform on image data of one screen and generates an transformed output. A quantizing circuit quantizes the transformed output with a predetermined temporary first quantization width upon reception of the first control signal and generates a first quantized output, and quantizes the transformed output with an optimal second quantization width upon reception of the second control signal and generates a second quantized output. An entropy coding circuit codes the first quantized output and generates a first coded output, and codes the second quantized output and generates a second coded output. An amount-of-codes calculator calculates the amount of codes of the first coded output for each block and calculates the amount of codes of one screen based on the amount of codes for each block. An assigned-amount-of-codes determining circuit determines the amount of codes assigned to each block based on the amount of codes for each block and the amount of codes of the one screen, and the target amount of codes. A quantization width predicting circuit predicts the second quantization width based on the amount of codes of the one screen. A coding stop circuit supplies a coding stop signal to the entropy coding circuit when the amount of codes of the second coded output exceeds the assigned amount of codes.

13 Claims, 7 Drawing Sheets

IMAGE DATA CODING APPARATUS AND CODING METHOD

BACKGROUND OF THE INVENTION

1. Field of the Invention

The present invention relates to a coding apparatus and a coding method of executing high-efficient coding to compress image data.

2. Description of the Related Art

In storing image signals picked up by a solid state image pickup apparatus, represented by a CCD (Charge Coupled Device), as digital data into a memory device such as a memory card or magnetic disk, because of a vast amount of data involved, data of the acquired image signals should be subjected to some sort of compression to store many frame images within a limited storage capacity. For instance, a digital electronic still camera stores picked-up images as digital data into a data storage medium, such as a memory card or magnetic disk, in place of silver salt film, so that the number of images recordable on a single memory card or magnetic disk drive is specified or restricted, and recording of the restricted number of images should be assured. Further, it is necessary that the time required for data recording/reproduction be short and constant.

As an image data compressing method, which satisfies these conditions, there is a well-known coding method which is a combination of the orthogonal transform coding and entropy coding.

A typical method of this type is what is studied in the international standardization of the still image.

This system will be briefly described below. To begin with, for example, a frame of image data is divided into blocks of a predetermined size, and each block of image data is subjected to two dimensional DCT (Discrete Cosine Transform) as orthogonal transform. Then, linear quantization according to each frequency component is executed. This quantized value undergoes Huffman coding as entropy coding. At this time, with regard to the DC component of this block, the differential value between the DC component and that of a nearby block is subjected to Huffman coding. An AC component undergoes so-called zigzag scanning from a low frequency component to a high frequency component and Huffman coding is executed on the basis of the number of consecutive components which are invalid (values being zero) and the value of the subsequent valid component. The above is the basic portion of this system.

With this basic portion alone, the amount of codes does not become constant for each image due to the use of the Huffman coding as entropy coding.

The following system has therefore been proposed as a method of controlling the amount of codes. First, the processing of the basic portion is executed, and the total amount of codes generated on the entire screen is acquired at the same time. From this total amount of codes and the desired or target amount of codes, the optimal quantization width to make the amount of codes approach the target amount of codes to the DCT coefficient will be predicted. Using this quantization width, the process following the quantization of the basic portion is repeated. Then, from the total amount of codes generated this time, the total amount of codes generated previously and the target amount of codes, the optimal quantization width to make the amount of codes approach the target amount of codes is predicted again. When the predicted quantization width coincides with the previous quantization width and the total amount of codes presently generated is less than the target amount of codes, the process is terminated and codes are output. If otherwise, the above described process will be repeated using a new quantization width.

The necessary quantization width is obtained by multiplying a basic form of the standard quantization characteristic by a quantization width coefficient $a$. More specifically, first, the aforementioned quantization of the basic portion is conducted with a quantization width acquired using a standard quantization width coefficient $a$, the result is subjected to the entropy coding, the resulting data of the total amount of codes is compared with the target total amount of codes preset as a limit, the final coding process is executed using the quantization width when the former amount reaches the latter, the optimal quantization width coefficient $a$ to make the amount of codes approach the target total amount of codes is acquired from the total amount of codes generated and the target amount, using the Newton-Raphson iteration method, for example, when the amount of codes is not within the target quantity, the basic form of the standard quantization characteristic is compensated using this obtained quantization width coefficient to thereby acquire more optimized quantization width, and the final processing is performed using this quantization width. In this manner, the characteristic of quantization is altered.

Figure 6:
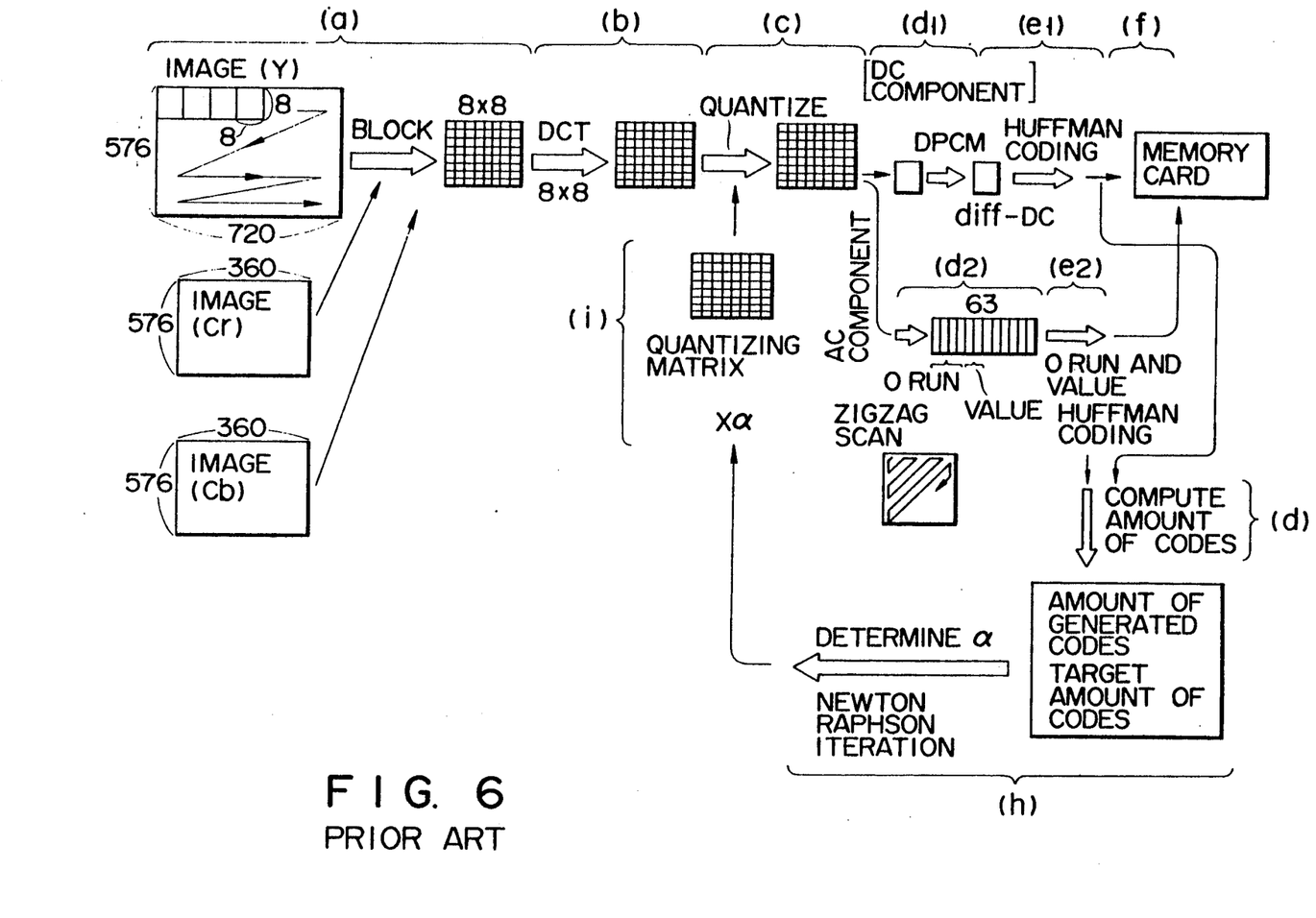
FIG. 6 is a diagram of an operational transition for explaining a conventional coding apparatus.

The above operation will be specifically explained below referring to FIG. 6. To begin with, as shown in (a) in this diagram, one frame of image data (one frame of image specified by the international standardization proposal is 720×576 pixels) is divided into blocks of a predetermined size (e.g., blocks A, B, C, . . . consists of 8×8 pixels), the two dimensional DCT is executed as orthogonal transform for each block, as shown in (b), and the resulting data is sequentially stored on an 8×8 matrix memory. The image data as viewed from the two-dimensional point has a spatial frequency that is the frequency data based on the distribution of density data.

Through the DCT, therefore, the image data is transformed into a DC component DC and an AC component AC, and data representing the DC component DC is stored on the 8×8 matrix memory at the origin (0, 0), data indicating the maximum frequency value of the AC component AC in the horizontal axial direction at (0, 7), data indicating the frequency value of the highest AC component AC in the vertical axial direction at (7, 0), and data representing the maximum frequency value of the AC component AC in the oblique direction at (7, 7). At the middle position, frequency data in the direction having correlation with the coordinates is stored in such a manner that data with lower frequency sequentially appear from the origin side.

Then, the data stored at each set of coordinates in this matrix is divided by the quantization width for each frequency component acquired by multiplication of the determined, quantized matrix by the quantization width coefficient $a$, thereby performing linear quantization (see (c)). The quantized value is then subjected to the Huffman coding as entropy coding. At this time, with regard to the DC component DC of this block, the differential value between the DC component DC and that of a nearby block is expressed by a group number (number of added bits) and added bits, the group number is subjected to the Huffman coding, and the acquired coded words in combination with the added bits are taken as coding data (d1, d2, e1, e2).

Regarding the AC component AC also, coefficients valid (values being not "0") are expressed by the group number and added bit.

Accordingly, the AC component AC undergoes the so-called zigzag scanning which is to scan data from a lower frequency component to a higher one, the two-dimensional Huffman coding is executed on the basis of the number of consecutive invalid (having a value of "0"), i.e., the number of zero runs, and the group number of the value of the subsequent valid component, with obtained coded words and added bits taken as coding data.

The Huffman coding is executed in such a way that with the peak frequency of occurrence in the data distribution of each of the DC component DC and AC component AC per frame image taken as the center, coded words are acquired by coding data with such bit assignment that the closer the data to the center, the fewer the number of bits assigned thereto, and the farther the data from the center, the greater the number of bits assigned thereto.

The above is the basic portion of this system.

With this basic portion alone, the amount of codes does not become constant for each image due to the use of the Huffman coding as entropy coding. For example, the following process is performed as a method of controlling the amount of codes.

First, the processing of the basic portion is executed using a temporary quantization width coefficient $\alpha$, and the total amount of codes (total number of bits) generated on the entire screen is acquired at the same time (see (g)). From this total amount of codes, the target amount of codes, and the temporary quantization width coefficient $\alpha$, the optimal quantization width coefficient $\alpha$ to make the amount of codes approach the target amount of codes to the DCT coefficient will be predicted by the Newton-Raphson iteration (see (h)). Using this quantization width coefficient $\alpha$ (i), the process following the quantization of the aforementioned basic portion is repeated. Then, from the total amount of codes generated this time, the total amount of codes generated previously the target amount of codes, the presently used quantization width coefficient $\alpha$, and the previously used quantization width coefficient $\alpha$, the optimal quantization width coefficient $\alpha$ to make the amount of codes approach the target amount of codes is predicted again.

When the predicted quantization width coefficient $\alpha$ coincides with the previous one $\alpha$ and the total amount of codes presently generated is less than the target amount of codes, the process is terminated and the presently generated code data is output and stored in the memory card (see (f)). If otherwise, the quantization width coefficient $\alpha$ is altered and the process is repeated using this new quantization width coefficient $\alpha$.

As described above, according to a digital electronic still camera, for instance, the number of images recordable on a single memory card or magnetic disk drive should be secured so that the image data is compressed before storage, which therefore requires that the processing time be as short as possible and constant from the view point of the operability. These conditions are somewhat needed not only in the digital electronic still cameras, but also in other applications.

The above-described system according to the proposal of the international standardization is a compressing method which satisfies those conditions. According to this system, however, although the combination of the orthogonal transform and entropy coding for each block as discussed in the foregoing description of the basic portion can compress image data at high efficiency, the amount of codes is not constant depending on images due to the use of the entropy coding, making unstable the number of images recordable on a recording medium, such as a memory card or magnetic disk drive.

Further, according to the method of controlling the amount of codes as exemplified in the description of the prior art, how many times the pass of the basic portion of the coding should be repeated would differ depending on images, making the processing time unstable and generally requiring a longer processing time.

SUMMARY OF THE INVENTION

It is therefore an object of the present invention to provide an image data coding apparatus and method capable of coding image data within a given processing time and within a specific amount of codes.

To achieve the object, according to one aspect of the present invention, an image data coding apparatus including first and second coding processes comprises:

control means for outputting first and second control signals at predetermined timings to execute the first and second coding processes;

orthogonal transform means for performing orthogonal transform on image data of one screen, divided into a plurality of blocks, block by block and generating an transformed output;

quantizing means for quantizing the transformed output from the orthogonal transform means with a predetermined temporary first quantization width upon reception of the first control signal from the control means and generating a first quantized output, and for quantizing the transformed output with an optimal second quantization width upon reception of the second control signal and generating a second quantized output;

entropy coding means for coding the first quantized output from the quantizing means and generating a first coded output in the first coding process, and coding the second quantized output and generating a second coded output in the second coding process;

amount-of-codes calculating means for calculating an amount of codes of the first coded output from the entropy coding means for each block and calculating an amount of codes of one screen based on the amount of codes for the each block, upon reception of the first control signal from the control means;

assigned-amount-of-codes determining means for determining an amount of codes assigned to each block based on the amount of codes for the each block and the amount of codes of the one screen, calculated by the amount-of-codes calculating means, and a target amount of codes;

quantization width predicting means for predicting the second quantization width based on the amount of codes of the one screen calculated by the amount-of-codes calculating means and the target amount of codes; and coding stop means for generating and supplying a coding stop signal to the entropy coding means in response to the second control signal from the control means so as to stop coding when the amount of codes of the second coded output generated by the entropy coding means exceeds the assigned amount of codes determined by the assigned-amount-of-codes determining means.

According to another aspect of the present invention, there is provided a coding method of executing orthogonal transform of image data of one screen divided into a plurality of blocks, block by block, and subjecting a transformed output to quantization and entropy coding to code data, comprising:

a first step of coding the data to find out an amount of data for each block required for optimization and an amount of data of one screen;

a second step of assigning an amount of data to each of the blocks and predicting a quantization width needed for optimization;

a third step of performing quantization for the each block using the predicted quantization width; and a fourth step of executing entropy coding of the each block within a range of the amount of data assigned to the block.

According to the present invention, image data is divided into blocks prior to orthogonal transform, quantization is performed with a temporary quantization width before executing the entropy coding, the amount of codes for each block and the amount of codes of the entire image are calculated, the amount of codes assigned to each block is computed and the optimal quantization width is predicted on the basis of these pieces of information (first coding). Then, after quantization of a transform coefficient having been subjected to orthogonal transform again is executed with a new quantization width, the entropy coding is performed in such a manner that the coding is stopped before the amount of codes exceeds the amount of codes assigned to each block in the first coding step.

Further, image data is divided into blocks, the orthogonal transform is executed for each block to separate components of the image data of each block sequentially from a low frequency component to a high one, the transformed output is quantized by the quantizing means, then the quantized output is supplied to the entropy coding means where it undergoes the entropy coding. With regard to the DC component DC of the image data of each block acquired by the orthogonal transform, the difference between this DC component DC and that of the previous block is acquired and the difference is subjected to entropy coding, and the AC component AC is subjected to entropy coding after the coding process of the DC component DC has been completed, whereby the amount of data for each block necessary for optimization and the amount of data of the entire image are found out. Based on the acquired pieces of information, the amount of data for each block is assigned and the quantization width necessary for optimization is predicted. Using this predicted quantization width, quantization is performed block by block and the entropy coding of each block is executed within a range of the assigned amount of information assigned to that block.

As described above, the present apparatus performs a statistical process first, checks the amount of information for each block necessary for optimization and the amount of information of the entire image, then enters a process of executing the optimal coding based on the information acquired by this statistical process, and sequentially controls the entropy coding in such a way that the amount of codes falls within the desired quantity while monitoring the coded output, thereby providing the coded output as the final output.

To realize the above, the apparatus performs blocking of an image first, quantization of elements of the blocked image using a standard quantization width, entropy coding of a transform coefficient acquired by the quantization, prediction of the quantization width necessary for the optimal amount of codes from information of the amount of codes of each image element in each block acquired by this entropy coding and information of the amount of codes of the entire image, decision of the assigned amount of codes for the individual elements of each block, transition to a process mode for the optimal coding of the image to be processed, on the basis of these pieces of information, blocking of the image by executing this process mode, quantization of the elements of the blocked image using the predicted quantization width, and entropy coding of a transform coefficient acquired by this quantization, the last process (entropy coding) including a process of subjecting the image elements to entropy coding within an allowable range with the assigned amount of codes of each element in each block as a reference and an output process to save the whole codes of the target image, thereby providing the final output. It is therefore possible to coding of acquired image data within a range of a given amount of codes and ensure a specific number of recordable images within the restricted memory capacity of the memory means in a case where the quantity of recordable images is specified. In addition, based on the results of a temporary statistical process to predict the amount of data of the entire image, the coding is executed so that the whole process will be finished in two passes: the statistical process and the coding process. This can ensure data coding within a specific processing time. Furthermore, since stopping the coding process is done to the high frequency component, hardly deteriorating the image quality.

According to the present invention, therefore, a specific amount of codes can be coded within a given processing time and the image quality hardly deteriorates.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Preferred embodiments of the present invention will now be described referring to the accompanying drawings.

To begin with, the basic principle of the present invention will be explained for easier understanding of this invention.

According to the present invention, image data undergoes a statistical process as a process for the first pass to predict the optimal quantization width coefficient and determine the amount of codes assigned to each block. As a process for the second pass, a final coding process is executed. The second pass process is such that image data is quantized for each block using the predicted quantization width coefficient, the coding proceeds while monitoring the amount of codes for that block so as to make the amount of codes acquired by the coding process fall within the amount of codes assigned to the block, and the coding of the block is terminated to proceed to the coding of the next block when the amount of codes including an EOB (End of Block) reaches the assigned amount of codes.

The statistical process is to predict the optimal quantization width and determine the amount of codes assigned to each block; the prediction of the optimal quantization width is done to make the amount of codes acquired at the coding time roughly (but with comparative precision) approach the desired or target amount of codes. The former amount of codes can closely approach the target amount of codes using the optimized quantization width. When the amount of codes is within the target amount of codes at this point of time, this process alone is sufficient. If the upper limit of the amount of data of one image is specified, however, the amount of codes should not exceed the target amount of codes by not only one byte, but one bit. It is therefore necessary to provide a process for the case where such exceeding occurs.

This process is the determination of the amount of codes assigned to each block. The process is to determine data used in fine adjustment when the amount of codes acquired at the coding time exceeds the target amount of codes. Based on the results of actually executing the coding process using the optimal quantization width predicted in the statistical process, the statistical process may be terminated when the acquired amount of codes exceeds the target amount of codes, and postprocessing may be executed when the exceeding event has occurred. However, this case needs three steps, the statistical process, coding process and postprocess, which takes time and requires that data be distinctly saved between the coding process and the postprocess without linking codes of different lengths. In this respect, it is desirable to perform fine adjustment during the coding process. Thinning data unnecessarily, however, would result in deterioration of the image quality and should be avoided.

According to the present invention, therefore, redundant data is eliminated from a high frequency component of each block, thereby minimizing the visual influence. As one cannot know whether or not the amount of codes exceeds the allowable level until the coding is completed, the discrimination is made block by block in the present invention.

It has been confirmed through experiments that the ratio of the amount of codes generated in each block when coding is performed in the statistical process using a temporary quantization width (which can be roughly predicted from the target amount of codes) to the amount of codes generated in each block when coding is performed using the optimal quantization width or the quantization width predicted in the statistical process does not vary so much. Based on this fact, a guide line "under which the amount of codes of the entire image will not exceed the target amount of codes" is set for each block and is used as a reference level to monitor the assigned amount of codes for each block.

Once the quantization width and the assigned amount of codes for each block have been determined, coding is executed based on the information to perform the final coding process.

In the coding process of the present invention, coding for each block is stopped before the amount of codes exceeds the assigned amount of codes of that block.

In coding each block, it is checked that the amount of codes does not exceed the guide line (assigned amount of codes) while sequentially performing the coding from a low frequency component to a high frequency component. For those blocks which have not exceeded the guide line, the coding will be terminated without problems, i.e., EOB will be output.

For that block which has exceeded during the coding process, the coding of higher frequency components will not be executed and will be stopped, terminating the coding of this block or outputting the EOB. At this time, since EOB is one of Huffman codes, the amount of codes including it should be within the assigned amount of codes.

Provided that coding of half the blocks of frame image data is completed without interruption and coding of the remaining half has been completed with part of very high frequency components omitted, a considerably small amount of data would be lost and the lost data would be limited to data of a high frequency component which has little visual influence. This system can always terminate the coding in two steps, namely the statistical process and coding process, can set the total amount of codes within a specified value without repeating the optimization several times unlike the prior art, and can suppress the deterioration of the image quality.

The following explains one embodiment of the present apparatus employing the above-described principle.

Figure 1:
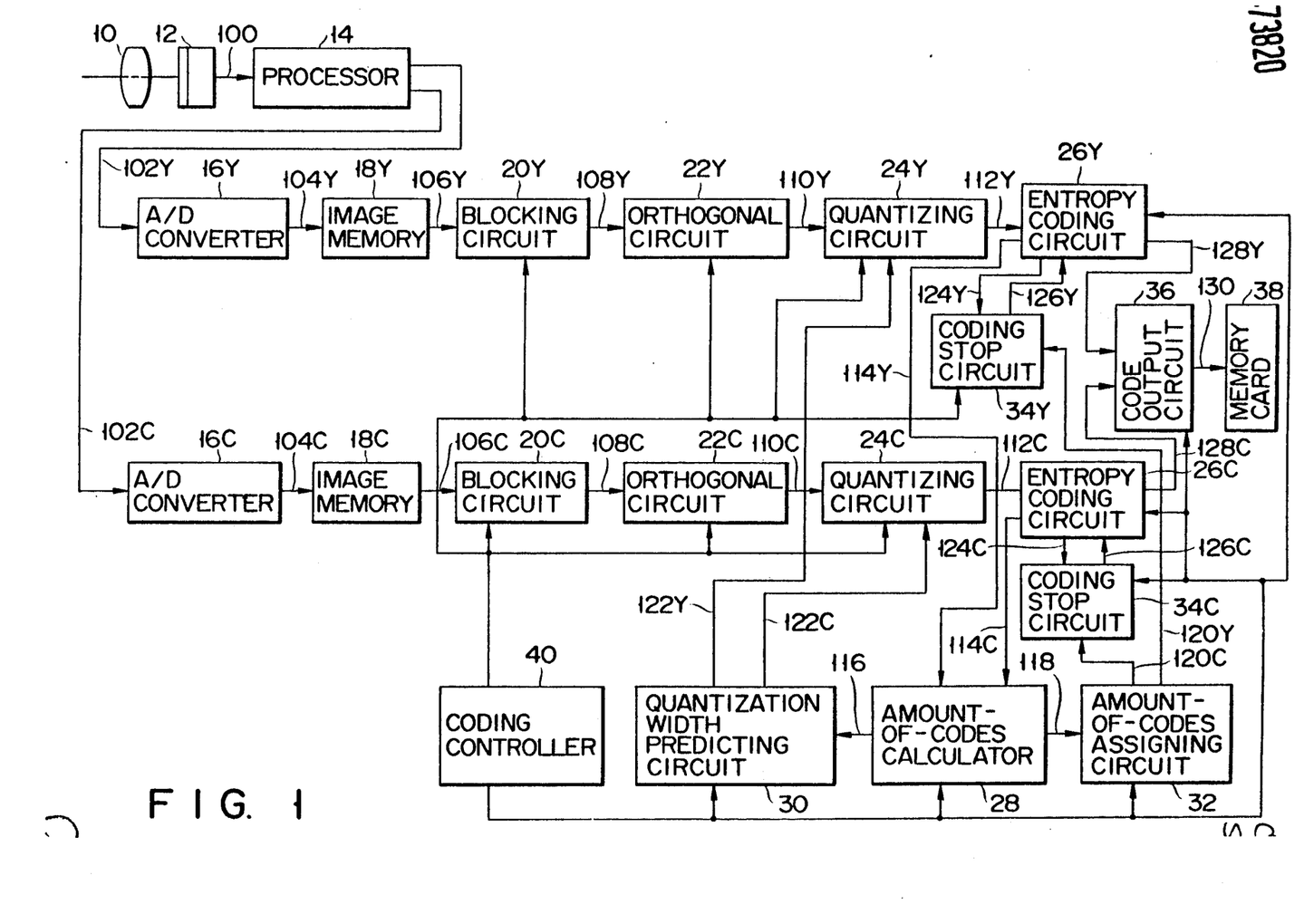
FIG. 1 is a block diagram illustrating one embodiment of the present invention.

FIG. 1 presents a block diagram of one embodiment of an image data coding apparatus of the present invention as applied to a digital electronic still camera. The description of those mechanisms of this camera which do not directly concern the present invention will be omitted.

Referring to FIG. 1, an image pickup device 12, such as a CCD, is located at the subsequent stage of an image pickup lens 10. The image pickup device 12 converts an optical image formed thereon by the pickup lens 10 into an image signal. A processor 14 receives the image signal from the image pickup device 12 via a signal line 100, and performs the gamma compensation and white balancing as well as separates the image signal into Y, R-Y (hereinafter referred to as Cr (chroma red)), and B-Y (hereinafter referred to as Cb (chroma blue)) components of a color signal.

An A/D converter 16Y performs analog-to-digital conversion of a signal of the Y component, and an A/D converter 16C analog-to-digital conversion of signals of the Cr and Cb components. Of the individual color components from the processor 14, the Y component undergoes A/D conversion in the A/D converter 16Y through a signal line 102Y, and the Cr and Cb components undergo A/D conversion in the A/D converter 16C through a signal line 102C.

Images 18Y and 18C, associated with the Y component and the Cr and Cb components, have a memory capacity of at least one frame of image and are designed to store the outputs of the A/D converters 16Y and 16C through respective signal lines 104Y and 104C.

Blocking circuits 20Y and 20C, associated with the Y component and the Cr and Cb components, receive image data (for one frame) from the associated image memories 18Y and 18C through respective signal lines 106Y and 106C and performs a blocking process of dividing the received image data into blocks of a predetermined size. In this example, the block size is 8×8 pixels; however, it is not restricted to this size but may differ between Y and C (chroma system). In this embodiment, the blocking circuit 20C of the chroma system first performs the whole blocking process on the image data of the Cr components, then blocks the image data of the Cb components.

Orthogonal transform circuits 22Y and 22C, associated with the Y component and the Cr and Cb components, receive image data blocked by the blocking circuits 20Y and 20C of the associated components, through respective signal lines 108Y and 108C, and perform two-dimensional orthogonal transform on the received image data block by block. As the orthogonal transform, cosine transform, sine transform, Fourier transform or Hadamard transform can be used. Executing the orthogonal transform provides image data as a transform coefficient.

Quantizing circuits 24Y and 24C, associated with the Y component and the Cr and Cb components, receive image data (transform coefficients) from the orthogonal transform circuits 22Y and 22C through respective signal lines 110Y and 110C, quantize the received data with value acquired by multiplying preset quantization widths of the individual frequency components by a preset quantization width coefficient $\alpha$ in the first quantization, and perform quantization in the second quantization or thereafter using an optimal quantization width coefficient $\alpha$ which has been determined in the previous process.

Entropy coding circuits 26Y and 26C, associated with the Y component and the Cr and Cb components, execute entropy coding of the quantized transform coefficients coming via respective signals 112Y and 112C. The entropy coding may be Huffman coding or computational coding. Since the entropy coding involves a variable length, the amount of codes for each block and the amount of codes of the entire image vary for each image. Although the type of entropy coding in use does not directly concern the present invention, the case illustrated here uses the Huffman coding.

Figure 2:
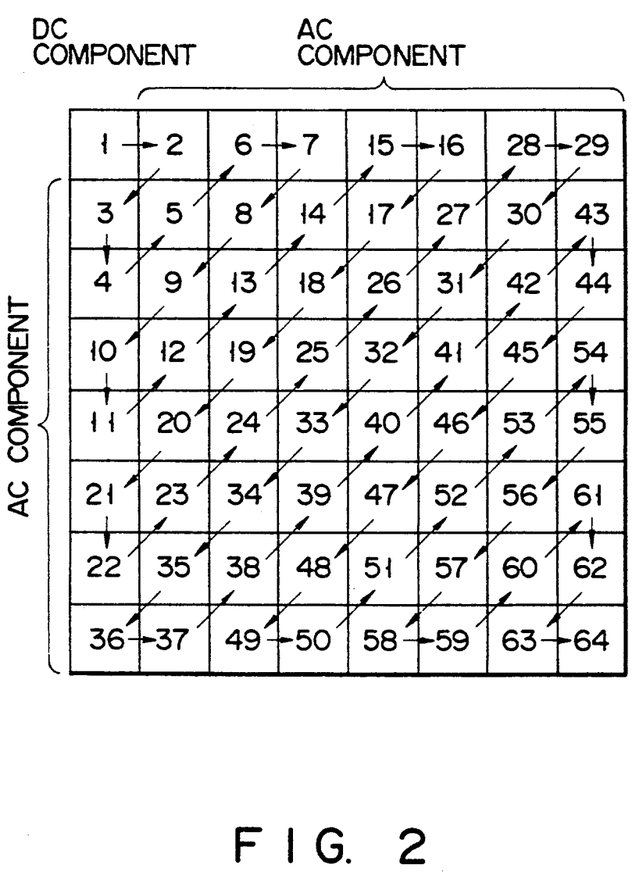
FIG. 2 is a diagram for explaining a zigzag scanning of divided blocks of 8×8 pixels.

The entropy coding circuits 26Y and 26C scan image data from a low frequency component to a high frequency component using the so-called zigzag scanning that scans the received, quantized transform coefficients in order illustrated in FIG. 2. Referring to FIG. 2, the differential value between data of the first DC component in the scanning order and data of the DC component of that block which has immediately previously been subjected to entropy coding is output as Huffman coding data. With regard to the AC components, when finding any transform coefficient which is not "0" (i.e., valid) while checking the transform coefficients in order for the second to sixty-fourth AC components in the illustrated scanning sequence, the circuits 26Y and 26C subject the data to the two-dimensional Huffman coding based on the number of consecutive transform coefficients of "0" (invalid), or zero runs, immediately preceding to the valid transform coefficient and the value of the valid transform coefficient. If there are consecutive invalid coefficients from a certain coefficient to the 64-th one, the entropy coding circuits 26Y and 26C output an EOB indicating the end of block. Upon reception of a stop signal, these circuits 26Y and 26C stop the coding process and send out outputs affixed with EOB. Then, the circuits 26Y and 26C send the amount of codes generated for that block to an amount-of-codes calculator 28 through respective signal lines 114Y and 114C.

The calculator 28 calculates the amount of codes of each input component Y, Cr or Cb for each block, and acquires a product of these amounts of codes for collection of data of the amount of codes for each block and computation of the amount of codes of the entire image of one frame. The calculator 28 sends the data of the amount of codes of the entire image to a quantization width predicting circuit 30 through a signal line 116, and sends the data of the amount of codes for each block and the data of the amount of codes of the entire one-frame image to an amount-of-codes assigning circuit 32 through a signal line 118.

The predicting circuit 30 predicts the optimal quantization width coefficient to make the calculated amount of codes approach the target amount of codes from the amount of codes of the entire one-frame image received from the calculator 28 and the target amount of codes or the maximum amount of data allowable per image in light of the actually used quantization width coefficient, using the Newton-Raphson iteration, for example.

The amount-of-codes assigning circuit 3 calculates the amount of codes assigned to each block from the amount of codes of image data for each block, the amount of codes of the entire one-frame image and the target amount of codes coming from the calculator 28, and sends the result to coding stop circuits 34Y and 34C. The calculation in this embodiment is a proportional distribution of the target amount of codes using the ratio of the amounts of codes for the individual blocks, for example. For instance, each circuit 34Y or 34C multiplies the amount of codes for one block by the target amount of codes and divides the result by the amount of codes of the entire image to thereby determine the assigned amount of codes for that block.

The amount-of-codes assigning circuit 32 has an amount-of-codes data table and an amount-of-codes-assigned-to-block data table. This circuit 32 rewrites data of the amount of codes at the associated block position in the former table by data of the amount of codes input from the amount-of-codes calculator 28, computes the amount of codes assigned to each block from the amount of codes for each block and the amount of codes of the entire image both from the calculator 28, and the target amount of codes, and stores the computed data in the latter table.

The data of the assigned amount of codes for each block in the amount-of-codes-assigned-to-block data table is supplied to the coding stop circuits 34Y and 34C when that block is subjected to entropy coding.

The circuits 34Y and 34C have a function to subtracting the amount of codes for each block from the amount-of-codes assigning circuit 32 from a predetermined reference, assigned amount of codes and outputs a stop signal through respective signal lines 126Y and 126C to terminate the coding of that block when the result of the subtraction becomes smaller than the sum of the amount of codes to be sent out and the code of EOB.

Referring to the assigned amount of codes, the circuits 34Y and 34C do not stop the coding when the amount of codes does not exceed the reference assigned amount of codes even if the received amount of codes to be transferred and the code of EOB are sent out, terminate the coding of that block and subtract the amount of codes to be transferred from the assigned amount of codes of the block.

A code output circuit 36 connects codes of a variable length coming through signal lines 128Y and 128C from the respective entropy coding circuits 26Y and 26C, and writes the connected codes on a memory card 38 through a signal line 130.

The present system performs a statistical process first, checks the amount of information for each block necessary for optimization and the amount of information of the entire image, then enters a process of executing the optimal coding based on the information acquired by this statistical process. To realize the above, the present system performs blocking of an image first, quantization of elements of the blocked image using a standard quantization width coefficient $\alpha$, entropy coding of a transform coefficient acquired by the quantization, prediction of the quantization width coefficient $\alpha$ necessary for the optimal amount of codes from information of the amount of codes of each image element in each block acquired by this entropy coding and information of the amount of codes of the entire image, decision of the assigned amount of codes for the individual elements of each block, transition to a process mode for the optimal coding of the image to be processed, on the basis of these pieces of information, blocking of the image by executing this process mode, quantization of the elements of the blocked image using the predicted quantization width coefficient $\alpha$, entropy coding of a transform coefficient acquired by this quantization, and an output process to save the whole codes of the target image. The general control of the above operations is performed by a coding controller 40.

Such a function of the controller 40 can easily be realized by using a microprocessor (CPU).

Figure 3:
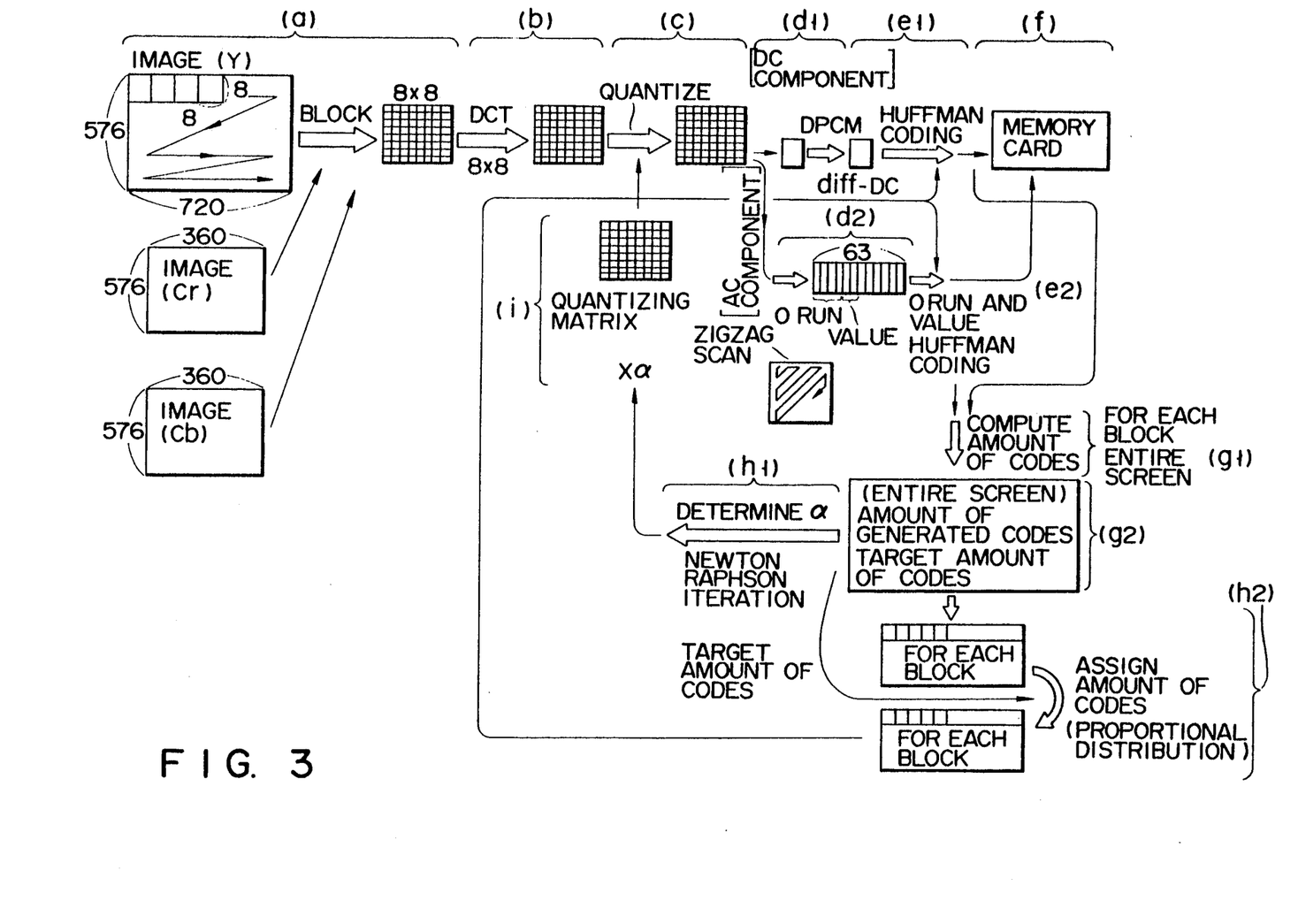
FIG. 3 is a diagram of an operational transition for explaining the operation of the embodiment of the present invention.

A description will now be given of the action of the thus constituted present apparatus with reference to FIG. 3 illustrating the operational transition.

When the image of a subject is picked up, it is formed as an optical image on the image pickup device 12 located at the subsequent stage of the pickup lens 10. The image pickup device 12 converts the optical image into an image signal and outputs it. This image signal is sent through the signal line 100 to the processor 14 which in turn separates individual color components, Y, Cr (R-Y) and Cb (B-Y), from the received image signal and performs the gamma compensation and white balancing.

Of the individual color components of the image signal from the processor 14, the Y component is supplied through the signal line 102Y to the A/D converter 16Y where it is converted into digital data before being output. The Cr and Cb components are supplied through the signal line 102C to the A/D converter 16C where they are converted into digital data before being output. The outputs of the A/D converters 16Y and 16C are recorded in the image memories of the respective systems through the associated signal lines 104Y and 104C.

The blocking circuits 20Y and 20C receive image data from the associated image memories 18Y and 18C through the respective signal lines 106Y and 106C, and divide the received image data into blocks of a predetermined size, as shown in FIG. 3; that is, the circuits 20Y and 20C perform a blocking process. In this example, the block size is $8 \times 8$ pixels. In this embodiment, the blocking circuit 20C first performs the whole blocking process on the image data of the Cr components, then blocks the image data of the Cb components.

The image data of the individual blocks, resulting from the blocking in the blocking circuits 20Y and 20C, are supplied through respective signal lines 108Y and 108C to the orthogonal transform circuits 22Y and 22C. The orthogonal transform circuits 22Y and 22C perform two-dimensional orthogonal transform, such as discrete cosine transform (DCT), on the received, blocked image data (hereinafter called "block image data") block by block. The DCT is to divide a waveform into frequency components and express them by cosine waves which are equal in quantity to the number of input samples.

The block image data (transform coefficient) undergone the orthogonal transform is stored at the associated frequency component position in the $8 \times 8$ matrix (which has such a frequency relation that the origin of the matrix is the DC component and the other are AC components whose frequency gets higher as they are farther away from the origin). This block image data is supplied via the signal lines 110Y and 110C to the quantizing circuits 24Y and 24C.

In turn, the circuits 24Y and 24C perform quantization on the block image data (transform coefficient) of the first pass (i.e., the first quantization). In the first quantization, the transform coefficient is quantized using the quantization width acquired by multiplying a preset quantized matrix for each frequency component (which is determined in association with each matrix position of the block) by a standard (temporary) quantization width coefficient. Although the quantized matrix at this time may be the same for the two quantizing circuits 24Y and 24C, better results would be attained if quantized matrixes suitable for the respective quantizing circuits are set.

The quantized block image data (transform coefficients) are input to the entropy coding circuits 26Y and 26C through the signal lines 112Y and 112C and are subjected to entropy coding there. The entropy coding circuits 26Y and 26C scan the received, quantized transform coefficients in zigzag manner from a low frequency component to a high frequency component in order illustrated in FIG. 2. That is, the transform coefficients are stored in an $8 \times 8$ matrix in association with the frequency components, and since the closer to the origin, the lower the frequency, it is possible to scan from a low frequency component to a high frequency component through the zigzag scanning shown in FIG. 2.

Referring to FIG. 2, since the first data in the scanning order is a DC component DC, the differential value diff-DC between the data of the first DC component DC and data of the DC component DC of that block which has immediately previously been subjected to entropy coding (i.e., the block preceding by one) is subjected to Huffman coding ((d1), (e1) in FIG. 3). With regard to the AC components AC, when finding any transform coefficient which is not "0" (i.e., valid) while checking the transform coefficients in order for the second to sixty-fourth AC components in the illustrated scanning sequence, the circuits 26Y and 26C subject the data to the two-dimensional Huffman coding based on the number of consecutive transform coefficients of "0" (invalid), or zero runs, immediately preceding to the valid transform coefficient and the value of the valid transform coefficient (see (d2), (e2) in FIG. 3).

If there are consecutive invalid coefficients from a certain coefficient to the 64-th one, the entropy coding circuits 26Y and 26C output an EOB indicating the end of block.

Then, the circuits 26Y and 26C send the amount of codes generated for that block to the amount-of-codes calculator 28 through the respective signal lines 114Y and 114C (see (g1) in FIG. 3). Such a process is executed for every block of one frame image.

In order to compute the amount of codes of the entire one frame image of the individual input components Y, Cr and Cb, the calculator 28 calculates the amount of codes of each input component Y, Cr or Cb for each block, and acquires a product of these amounts of codes for collection of data of the amount of codes for each block (see (g2) in FIG. 3). The calculator 28 sends the data of the amount of codes for each block the amount-of-codes assigning circuit 32 through the signal line 118. The circuit 32 writes the received data as data of the amount of codes at the corresponding block position in the amount-of-codes data table.

When the Huffman coding of every block of one frame image is completed, the calculator 28 sends the data of the amount of codes of the entire image to the quantization width predicting circuit 30 through the signal line 116, and sends the data of the amount of codes for each block and the data of the amount of codes of the entire one frame image to the amount-of-codes assigning circuit 32 through the signal line 118, under the control of the coding controller 40.

The predicting circuit 30 predicts the optimal quantization width coefficient &A to make the calculated amount of codes approach the target amount of codes from the received data of the amount of codes of the entire one frame image and data of the target amount of codes based on the actually used quantization width coefficient, using the Newton-Raphson iteration, for example (see (h1) in FIG. 3).

The amount-of-codes assigning circuit 32 calculates the amount of codes assigned to each block from the amount of codes of image data for each block, the amount of codes of the entire one frame image and the target amount of codes coming from the calculator 28 through, for example, a proportional distribution of the target amount of codes using the ratio of the amounts of codes for the individual blocks (see (h2) in FIG. 3).

More specifically, to determine the assigned amount of codes of one block, the amount of codes of this block is multiplied by the target amount of codes, the result is divided by the amount of codes of the entire image, and the result is taken as the assigned amount of codes. Data of the calculated assigned amount of codes of each block is stored in the amount-of-codes-assigned-to-block data table. The data of the assigned amount of codes for each block in this data table is supplied to the coding stop circuits 34Y and 34C through the signal lines 120Y and 120C at the time the associated block is subjected to entropy coding.

Through the above operation, the first pass or the first coding (statistical process) for determining the assigned amount of codes of each block and optimizing the quantization width is completed.

Then, the operation enters the second pass, or the second coding, which provides a final coded output so optimized as to make the amount of codes fall within the target amount of codes.

First, image data of individual color components stored in the image memories 18Y and 18C are sent through the respective signal lines 106Y and 106C to the associated blocking circuits 20Y and 20C for a reblocking process (see (a)).

The block image data is supplied through the respective signal lines 108Y and 108C to the associated orthogonal transform circuits 22Y and 22C to undergo the orthogonal transform again (see (b)). The transform coefficient acquired by the orthogonal transform is sent through the signal lines 110Y and 110C to the associated quantizing circuits 24Y and 24C for requantization (see (c)).

It should be noted that the quantization width coefficient $\alpha$ in use at this time is the predicted optimal quantization width coefficient $\alpha$ computed by the quantization width predicting circuit 30 in the previous pass.

Then, the transform coefficient of the quantized block image data is supplied through the respective signal lines 122Y and 122C to the entropy coding circuits 26Y and 26C. The entropy coding like in the case of the statistical process, is performed in such a manner that, of the transform coefficients of this block image data, the differential value diff-DC of the DC component DC is subjected to Huffman coding first ((d1), (e1)), and then the AC components AC are sequentially extracted through zigzag scanning and are subjected to Huffman coding ((d2), (e2)).

Every time a Huffman code for on element (one position in the matrix) is generated, the assigned amount of codes at the position of the element in the amount-of-codes-assigned-to-block data table is sent through the signal lines 124Y and 124C to the coding stop circuits 34Y and 34C. Based on the received assigned amount of codes of each block, the circuits 34Y and 34C generate no stop signal and subtract the amount of codes to be transferred from the assigned amount of codes of that block if the to-be-transferred amount of codes and the code of EOB sent together do not exceed the assigned amount of codes.

When the sum of the to-be-transferred amount of codes and the code of EOB exceeds the amount of the remainder of the assigned amount of codes, the coding stop circuits 34Y and 34C send stop signals through the signal lines 126Y and 126C to the associated entropy coding circuits 26Y and 26C to terminate the Huffman coding of that block. The circuits 26Y and 26C proceed to the Huffman coding of the next block acquired by the quantizing circuits 24Y and 24C.

Upon reception of no stop signals from the coding stop circuits 34Y and 34C through the signal lines 126Y and 126C, therefore, the entropy coding circuits 26Y and 26C send out the transformed Huffman codes through the signal lines 128Y and 128C to the code output circuit 36. If the Huffman coding for every element in the matrix has been completed before generation of the stop signal, the entropy coding circuits 26Y and 26C output the code of EOB to the code output circuit 36 through the signal lines 128Y and 128C.

Upon reception of the stop signals before completion of the Huffman coding for every element in the matrix, the entropy coding circuits 26Y and 26C output the code of EOB instead of the Huffman code to the code output circuit 36 through the signal lines 128Y and 128C.

The entropy coding circuits 26Y and 26C then proceed to the Huffman coding of the next block acquired by the quantizing circuits 24Y and 24C.

The above operation is repeated until the processing of every block of one screen of image is ended, terminating the entire coding process.

At the end of the coding process, the optimized Huffman coding data for one frame image is written on the memory card 38 (see (f)).

The data writing is executed by the code output circuit 36; the circuit 36 connects the Huffman codes of a variable length from the entropy coding circuits 26Y and 26C coming through the signal lines 128Y and 128C and sends the result through the signal line 130 to the memory card 38 for data writing (see (f)). The whole data writing on the memory card 38 by the circuit 36 can be executed at the end of the second pass. Alternately, every time the results of connecting the Huffman codes of a variable length become one byte or several bytes when the process having completed the first pass has just entered the second pass, they may be sequentially written on the memory card 38.

Figure 4A:
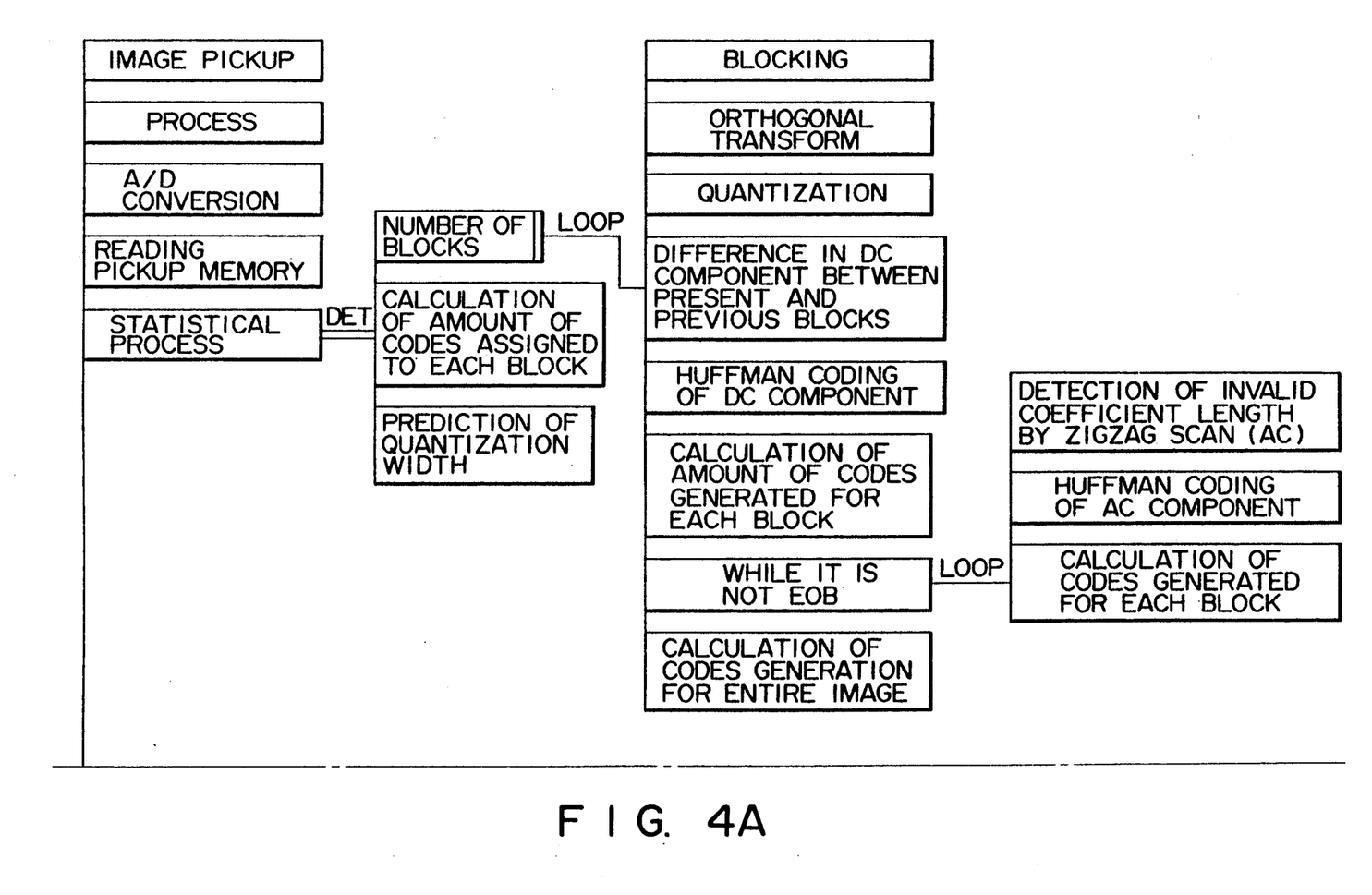
FIG. 4A and 4B are flowcharts for explaining the operation of a coding apparatus embodying the present invention.
Figure 4B:
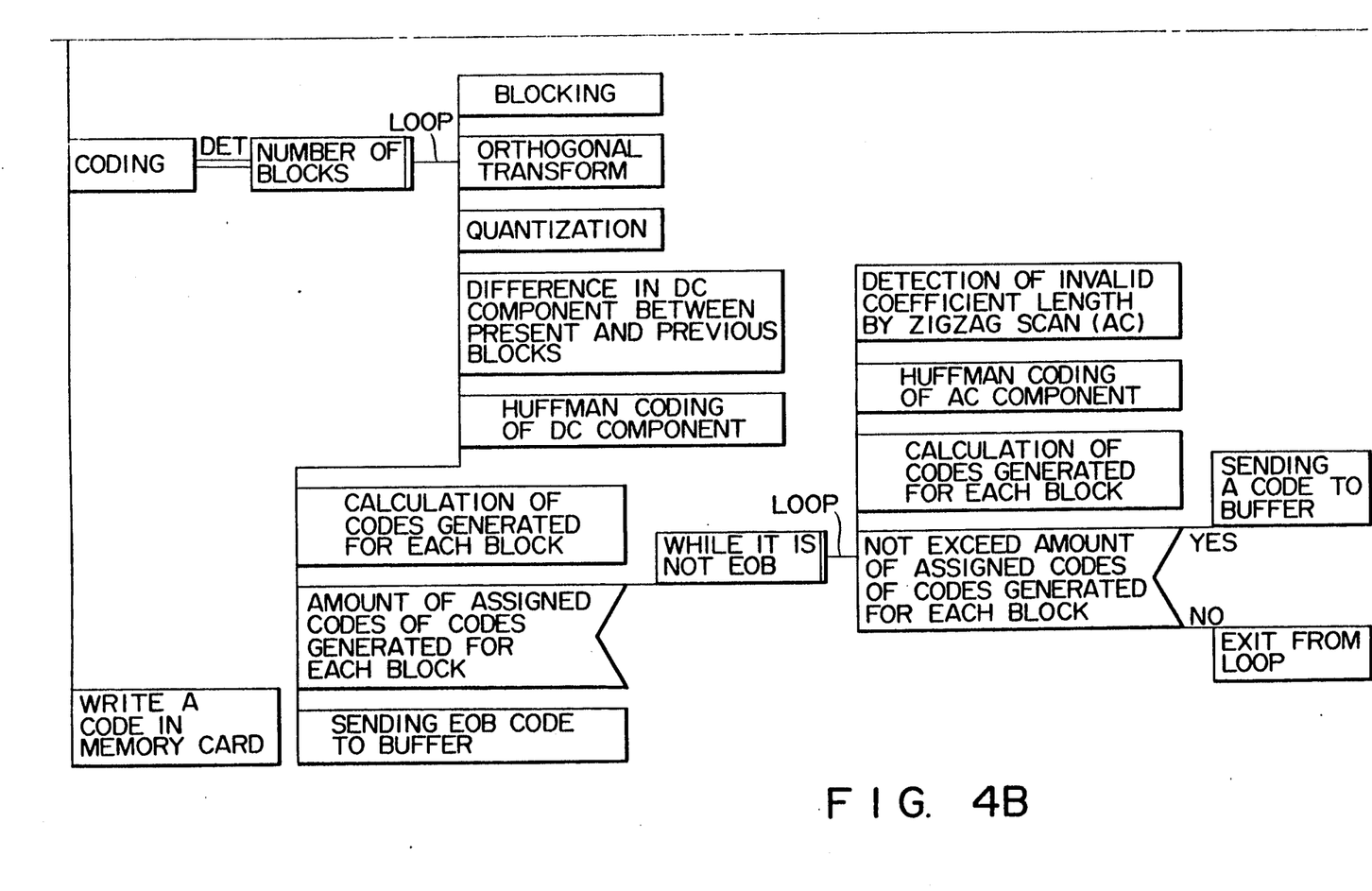

FIGS. 4A and 4B present PAD flowcharts of the above-described process.

As described above, the key point of the present apparatus lies in that the amount of codes in the coding process can approach the target amount of codes by performing the statistical process using a temporary quantization width and predicting the optimal quantization width based on the data, and the amount of codes in the coding is inhibited from exceeding the target amount of codes by determining the assigned amount of codes of each block. Accordingly, the present invention is not restricted to the block size, the type of orthogonal transform and the type of the entropy coding used in the above-described embodiment. Further, the image memories 18Y and 18C may be located between the orthogonal transform circuits 22Y and 22C and the quantizing circuits 24Y and 24C, in which case the blocking process and the orthogonal transform process in the coding process can be omitted. In this case, however, the size of the image memories should increase to maintain the accuracy. In addition, the process 14 may perform the digital processing after A/D conversion. Furthermore, according to the present apparatus, since the entropy coding for each block is performed starting from a low frequency component and a high frequency component which has a relatively little influence on the image quality is coded in a range where the assigned amount of codes is not so tight, deterioration of the image quality can be minimized and the coding can be done with high compression.

Another embodiment of the present invention will now be explained.

Figure 5:
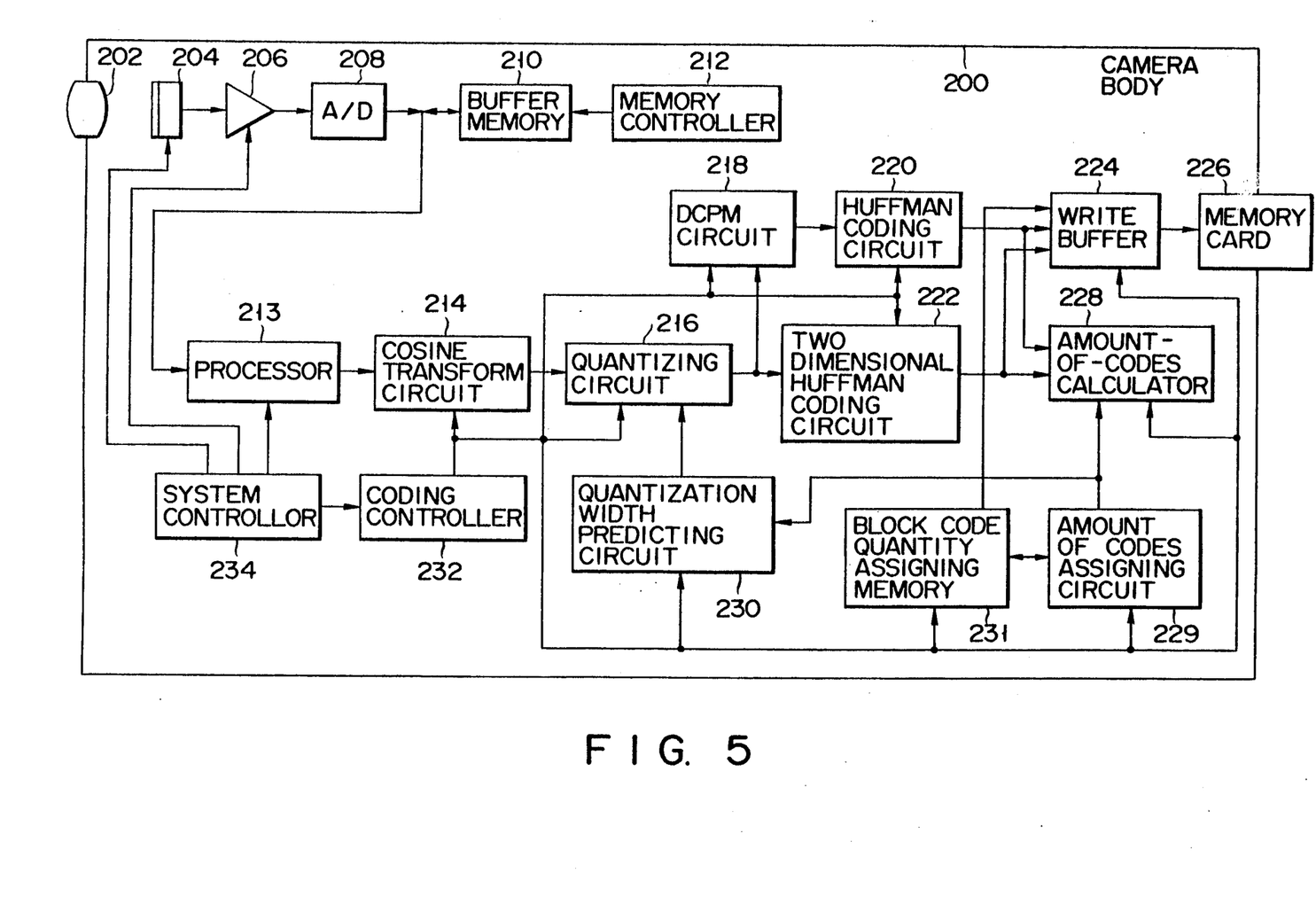
FIG. 5 is a block diagram for explaining another embodiment of the present invention.

FIG. 5 is a block structural diagram of the second embodiment of the present invention as applied to an electronic still camera.

As shown in FIG. 5, an electronic still camera body 200 includes the following components. Reference numeral 202 denotes an image pickup lens of the camera, and reference numeral 204 a CCD-based image pickup device. The light-receiving face of the image pickup device 204 is located at the image forming position of the image pickup lens 202. The light-receiving face of the image pickup device 204 has color filters provided corresponding to pixels. The color filters are arranged so that individual pixels of the image pickup device 204 are sensitive to color components, such as cyan (Cy), Magenta (Ma), and yellow (Ye). A preamplifier 206 amplifies the output of the image pickup device 204, and eliminates noise before outputting it.

An A/D converter 208 converts the output of the preamplifier 206 to a digital signal. A buffer memory 210 of RAM (Random Access Memory) type stores the digital image signal from the A/D converter 208. A memory controller 212 controls the timings of addressing, reading, and writing the RAM in the buffer memory 210. A processor 213 processes data read from the buffer memory 210 through digital processing. Although an ordinary processor performs processing, such as applying a gamma characteristic and a knee characteristic, the processor in this embodiment does not execute such a non-linear process in order to permit an orthogonal transform to be correctly executed later.

Therefore, the processor 213 serves to execute matrix operation to individual color components, Cy, Ma, and Ye so as to convert them to color components Cy, Ma, and Ye which will be required later, and to perform the proper band compensation on these signals. A process such as gamma compensation is performed at the time a signal stored on a memory card 226 is reproduced.

A cosine transform circuit 214 perform cosine-conversion on a signal which has been processed and sent from the processor 213. The cosine transform circuit of the embodiment outputs the transformed cosine coefficient in order of the zigzag scanning as shown in FIG. 2. The cosine coefficient is, therefore, sent to a quantizing circuit at the subsequent stage in the manner of zigzag scanning; there is no need to change to the zigzag scanning in the entropy coding circuit as done in the previous embodiment.

A quantizing circuit 216 serves to quantize the output of the cosine transform circuit 214. A quantization width can be set whenever quantization is performed in the quantizing circuit 216.

A DCPM (Differential Pulse Code Modulation) circuit 218 (Predictive Coding; different component PCM) receives a DC component of the cosine transform coefficient quantized by the quantizing circuit 216, and acquires the differential value between this DC component and that of the previous block. The output of the DCPM circuit 218 is sent to a Huffman coding circuit 220. A two-dimensional Huffman coding circuit 222 receives an AC component of the cosine transform coefficient quantized by the quantizing circuit 216, and performs two-dimensional Huffman coding on the AC component.

Upon reception of the outputs of the Huffman coding circuit 220 and the two-dimensional circuit 222, a write buffer 224 temporarily holds these outputs, then transfers them to a memory card 226 as a memory medium for data writing.

An amount-of-codes calculator 228 receives and accumulates the outputs of the Huffman coding circuit 220 and the two-dimensional circuit 222, and computes the generated amount of codes.

The amount-of-codes calculator 228 is sent through a quantization width predicting circuit 230 to the quantizing circuit 216.

Reference numeral "229" denotes an amount-of-codes assigning circuit, and "231" denotes a block code quantity assigning memory. A coding controller 232 is connected to the individual circuits 216, 218, 220, 222, 224, 228, 229, and 231. A system controller 234, which performs the general control of the still camera system, is constituted using a CPU.

The system controller 234 controls the read/write operation and address setting for the memory card 226 to store data from the write buffer 224.

When the image pickup is invoked by switching a trigger switch (not shown) provided on the camera body 200 with the above-described structure, a shutter function is activated the image of a subject is formed by the image pickup lens 202 in the image pickup device 204. As a charge image corresponding to the formed image is accumulated in the image pickup device 204, it is possible to acquire an image signal from the image pickup device 204 by controlling the reading of the charge image. The system controller 20 also executes such a control. The image signal sent from the image pickup device 204 is sent to the preamplifier 206 for amplification and noise elimination. Then, the image signal is converted to a digital signal by the A/D converter 208, and is written in the buffer memory 210.

The digital signal in the buffer memory 210 is blocked in the size of 8 by 8 pixels by the memory controller 212 to be read out in that form. The read image signal is subjected to a matrix process by the processor 213. In this process, the system controller 234 sets the matrix coefficient for a Y signal, so that the processor 213 generates one screen of brightness signals (Y components) block by block. The system controller 234 alters the matrix coefficient in the order of Cr and Cb components, so that the processor 213 generates one screen of signals of the Cr and Cb components block by block as well, and sends them out.

The cosine transform circuit 214 then performs the cosine transform, and sends the resulting cosine transform coefficient to the quantizing circuit 216 in order of the zigzag scanning.

The quantization is executed in the quantizing circuit 216 in such a manner that the transform coefficients of frequency components are divided by the associated values acquired by multiplying the quantized matrix by the quantization width coefficient $\alpha$. For the quantization at the first path (first quantization), the initial value given by the coding controller 232 is used as the quantization width coefficient $\alpha$.

With regard to only the DC component among the quantized transform coefficients, the differential value between the DC component and that of the previous block is acquired by the DCPM circuit 218, and is coded by the Huffman coding circuit 220. The two-dimensional Huffman coding circuit 222 performs the two-dimensional Huffman coding on zero runs and valid coefficient values in the scanning order as shown in FIG. 2.

The codes generated in each block are sent from the Huffman coding circuit 220 and the two-dimensional Huffman coding circuit 222 to the amount-of-code calculator 228, which calculates the amount of codes and adds up for the entire screen for each color component. The amount of codes for each block is written through the amount-of-codes assigning circuit 229 into the block code quantity assigning memory 231.

When the Huffman coding process is completed for every block for one screen and every color component, the amount-of-codes calculator 228 supplies the amount-of-codes data of the whole image to the quantization width predicting circuit 230 and the amount-of-codes assigning circuit 229 with the help of the coding controller 232.

The quantization width predicting circuit 230 predicts the optimal quantization width coefficient $\alpha$ from the amount of the codes in the entire image and the target among of the codes. From the amount of the codes for each block stored in the block code quantity assigning memory 231, the amount of the codes in the whole image, and the target amount of the codes, the amount-of-codes assigning circuit 229 calculates the amount of the codes assigned to each block, and writes this amount into the block codes quantity assigning memory 231.

The above completes the first path, and the operation then moves to the process of the second path.

In the process of the second path, the image signal is again read from the buffer memory 210 block by block. After processed in the processor 213, this signal is subjected to cosine transform in the cosine transform circuit 214. The acquired transform coefficient is to be quantized in the quantizing circuit 216 using the quantization width coefficient $\alpha$ which is the optimal quantization width coefficient $\alpha$ that has been calculated in the previous pass by the quantization width predicting circuit 230.

Among the quantized transform coefficients, the DC component is sent to the DCPM circuit 218 where the differential value between this DC component and that of the previous block is acquired. This value is then coded in the Huffman coding circuit 220.

The two-dimensional Huffman coding circuit 222 performs two-dimensional coding on zero runs and valid coefficient values of the DC component through zigzag scanning. The generated codes are supplied block by block to the writing buffer circuit 224, which in parallel receives the assigned amount of codes stored in the block code quantity assigning memory 231 and adds it to the amount of the remainder of the assigned codes up to the previous block, which are held in the writing buffer circuit 224.

The writing buffer circuit 224 compares the amount of generated codes with the assigned amount of codes (including the remainder of the previous block, if present). If the amount of generated codes is equal to or less than the assigned amount of codes, the former amount is written into the memory card 226 without changing.

If the amount of generated codes exceeds the assigned amount of codes, the coding stops at such a position as to make the amount of generated codes come within the assigned amount of codes, and the coding of the following high frequency components (the rear part in the zigzag scanning) are left out and EOB is put instead. The writing buffer circuit holds the remainder of the assigned amount of codes from which the actual amount of written codes has been subtracted. The codes associated with the AC component should always be output, and the short amount of codes is held in the writing buffer circuit 224 in the form of a negative value as the remainder of the assigned amount of codes.

The codes included in the assigned amount of codes in this way are stored in the memory card 226. Repeating this operation for all the blocks and all the color components, coding for one screen will be completed.

In the embodiment described above, color components, Cy, Ma, and Ye, which are read from the image pickup device 204, are respectively converted into Y, Cr, and Cb through the matrix process. If color signals of the three primary color components, red, green, and blue, can be acquired through the corresponding red, green, and blue filters provided in the image pickup device 204, it is possible to employ a system which uses the three primary color components, red (R), green (G), and blue (B) as they are. In this system, reading out the signals for each primary color component can ensure the coding of image data in the order of R, G, and B without the matrix process.

As described above, according to the embodiment shown in FIG. 5, the individual components Y, Cr and Cb are generated and subjected to coding process in order, and a single process is commonly used for the components Y, Cr and Cb to simplify the hardware. The structure of this embodiment can reduce the cost of electronic still cameras.

As the reproducing system does not directly relate to the present invention, it will be described only briefly.

Image signal data coded in compressed manner and recorded on a recording medium is read out together with data of the quantization width used at the coding time, and the image signal data, undergone the Huffman coding, is subjected to Huffman decoding to provide a quantized coefficient. This coefficient is subjected to reverse quantization with the mentioned quantization width to be a transform coefficient. The transform coefficient is subjected to reverse orthogonal transform to be restored to the original image signal.

Image signals are restored in the order of Y, Cr and Cb in the above manner, and are then stored in the buffer memory. When writing image signal data for one screen is completed, this data is read out therefrom in the ordinary scanning order of television signals. The read data is converted into an image signal of the NTSC system, then subjected to D/A conversion to be an analog signal as a final output. When this image signal is input to a television monitor, an image can be reproduced as a television image for visual enjoyment. In addition, sending the image signal to a printer apparatus, such as a video printer, yields a hard copy of the image, which can be enjoyed in the same manner as photographs.

As described above, the present apparatus performs a statistical process first, checks the amount of information for each block necessary for optimization and the amount of information of the entire image, then enters a process of executing the optimal coding based on the information acquired by this statistical process, and sequentially controls the entropy coding in such a way that the amount of codes falls within the desired quantity while monitoring the coded output, thereby providing the coded output as the final output.

To realize the above, the apparatus performs blocking of an image first, quantization of elements of the blocked image using a standard quantization width, entropy coding of a transform coefficient acquired by the quantization, prediction of the quantization width necessary for the optimal amount of codes from information of the amount of codes of each image element in each block acquired by this entropy coding and information of the amount of codes of the entire image, decision of the assigned amount of codes for the individual elements of each block, transition to a process mode for the optimal coding of the image to be processed, on the basis of these pieces of information, blocking of the image by executing this process mode, quantization of the elements of the blocked image using the predicted quantization width, and entropy coding of a transform coefficient acquired by this quantization, the last process (entropy coding) including a process of subjecting the image elements to entropy coding within an allowable range with the assigned amount of codes of each element in each block as a reference and an output process to save the whole codes of the target image, thereby providing the final output. It is therefore possible to coding of acquired image data within a range of a given amount of codes and ensure a specific number of recordable images within the restricted memory capacity of the memory means in a case where the quantity of recordable images is specified. In addition, based on the results of a temporary statistical process to predict the amount of data of the entire image, the coding is executed so that the whole process will be finished in two passes: the statistical process and the coding process. This can ensure data coding within a specific processing time. If the coding apparatus or coding method according to the present invention is applied to a digital electronic still camera, each picture taken by the camera can be coded into an amount of coded image data, which falls within a predetermined range. Hence, a specific number of images recordable on memory means such as a memory card and a magnetic disk apparatus can be ensured. In addition, since the apparatus or the method makes it possible to code each picture into image data within a short period of time and a specific processing time, a plurality of pictures can be recorded in a memory card or on a magnetic disk even if the picture are taken continuously at short internals.

Furthermore, since stopping the coding process is done to the high frequency component, hardly deteriorating the image quality.

The present invention is not restricted to the embodiments described above and illustrated in the accompanying drawings, but may be modified in various manners without departing from the scope and spirit of the invention. For instance, although the Y signal and C signal are processed in parallel in the first embodiment, the quantization matrix and Huffman tables may be designed to be switchable, so that the Y, Cr and Cb components can be processed in order by a circuit of a single system.

As described above, the present invention can provide an image data coding apparatus and coding method which can code acquired image data in such a manner that a specific amount of codes can be coded in a relatively short period of time and within a given processing time, and without almost any deterioration of the image.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image data coding apparatus including first and second coding processes comprising:

control means for outputting first and second control signals at predetermined timings to execute said first and second coding processes;

orthogonal transform means for performing orthogonal transform on image data of one screen, divided into a plurality of blocks, block by block and generating an transformed output;

quantizing means for quantizing said transformed output from said orthogonal transform means with a predetermined temporary first quantization width upon reception of said first control signal from said control means and generating a first quantized output, and for quantizing said transformed output with an optimal second quantization width upon reception of said second control signal and generating a second quantized output;

entropy coding means for coding said first quantized output from said quantizing means and generating a first coded output in said first coding process, and coding said second quantized output and generating a second coded output in said second coding process;

amount-of-codes calculating means for calculating an amount of codes of said first coded output from said entropy coding means for each block and calculating an amount of codes of one screen based on said amount of codes for said each block, upon reception of said first control signal from said control means;

assigned-amount-of-codes determining means for determining an amount of codes assigned to each block based on said amount of codes for said each block and said amount of codes of said one screen, calculated by said amount-of-codes calculating means, and a target amount of codes;

quantization width predicting means for predicting said second quantization width based on said amount of codes of said one screen calculated by said amount-of-codes calculating means and said target amount of codes; and coding stop means for generating and supplying a coding stop signal to said entropy coding means in response to said second control signal from said control means so as to stop coding when said amount of codes of said second coded output generated by said entropy coding means exceeds said assigned amount of codes determined by said assigned-amount-of-codes determining means.

2. An apparatus according to claim 1, further comprising code output means for writing said second coded output of said entropy coding means as a code on a recording medium.

3. An apparatus according to claim 1, wherein said image data includes color image data separated for individual color components.

4. An apparatus according to claim 1, wherein said coding stop means include means for stopping coding of a high frequency component of said image data.

5. An image data coding apparatus including first and second coding processes comprising:

control means for outputting first and second control signals at predetermined timings to execute said first and second coding processes;

orthogonal transform means for performing orthogonal transform on image data of one screen, divided into a plurality of blocks, block by block and generating an transformed output;

quantizing means for quantizing said transformed output from said orthogonal transform means with a predetermined temporary first quantization width upon reception of said first control signal from said control means and generating a first quantized output, and for quantizing said transformed output with an optimal second quantization width upon reception of said second control signal and generating a second quantized output;

entropy coding means for coding said first and second quantized outputs from said quantizing means and generating first and second coded outputs in said first and second coding processes, said entropy coding means including a DC coding processing section for coding a difference between a DC component of image data of one block and that of a previous block and an AC coding processing section for coding an AC component after DC coding is completed;

amount-of-codes calculating means for calculating an amount of codes of said first coded output from said entropy coding means for each block and calculating an amount of codes of one screen based on said amount of codes for said each block, upon reception of said first control signal from said control means;

assigned-amount-of-codes determining means for determining an amount of codes assigned to each block based on said amount of codes for said each block and said amount of codes of said one screen, calculated by said amount-of-codes calculating means, and a target amount of codes;

quantization width predicting means for predicting said second quantization width based on said amount of codes of said one screen calculated by said amount-of-codes calculating means and said target amount of codes; and coding stop means for generating and supplying a coding stop signal to said entropy coding means in response to said second control signal from said control means so as to stop coding when said amount of codes of said second coded output generated by said entropy coding means exceeds said assigned amount of codes determined by said assigned-amount-of-codes determining means.

6. An apparatus according to claim 5, further comprising code output means for writing said second coded output of said entropy coding means as a code on a recording medium.

7. An apparatus according to claim 5, wherein said image data includes color image data separated for individual color components.

8. An apparatus according to claim 5, wherein said coding stop means include means for stopping coding of a high frequency component of said image data.

9. A coding method of executing orthogonal transform coding of image data of one screen divided into a plurality of blocks, block by block, and subjecting a transformed output to quantization and entropy coding to code data, said method comprising:

a first step of coding said data lo find out an amount of data for each block required for optimization and an amount of data of one screen;

a second step of assigning an amount of data to each of said blocks and predicting a quantization width needed for optimization;

a third step of performing quantization for said each block using said predicted quantization width; and a fourth step of executing entropy coding of said each block within a range of said amount of data assigned to said block.

10. A coding method of executing orthogonal transform coding of image data of one screen divided into a plurality of blocks, block by block, separating components of said image data block by block from a low frequency component to a high frequency component and subjecting a transformed output to quantization and entropy coding to code data, said method comprising:

a first step of subjecting a difference between a DC component of one of said blocks of image data, acquired by said orthogonal transform, and that of a previous block, and subjecting an AC component of said data after said DC coding to thereby check an amount of data for each block required for optimization and an amount of data of one screen;

a second step of assigning an amount of data to each of said blocks and predicting a quantization width needed for optimization;

a third step of performing quantization for said each block using said predicted quantization width; and a fourth step of executing entropy coding of said each block within a range of said amount of data assigned to said block.

11. An electronic still camera having an image data coding apparatus including first and second coding processes, comprising:

an image pickup section for receiving optical information from a subject to be picked up and outputting image data;

control means for outputting first and second control signals at predetermined timings to execute said first and second coding processes;

orthogonal transform means for performing orthogonal transform on image data of one screen, divided into a plurality of blocks, block by block and generating an transformed output;

quantizing means for quantizing said transformed output from said orthogonal transform means with a predetermined temporary first quantization width upon reception of said first control signal from said control means and generating a first quantized output, and for quantizing said transformed output with an optimal second quantization width upon reception of said second control signal and generating a second quantized output;

entropy coding means for coding said first quantized output from said quantizing means and generating a first coded output in said first coding process, and coding said second quantized output and generating a second coded output in said second coding process;

amount-of-codes calculating means for calculating an amount of codes of said first coded output from said entropy coding means for each block and calculating an amount of codes of one screen based on said amount of codes for said each block, upon reception of said first control signal from said control means;

assigned-amount-of-codes determining means for determining an amount of codes assigned to each block based on said amount of codes for said each block and said amount of codes of said one screen, calculated by said amount-of-codes calculating means, and a target amount of codes;

quantization width predicting means for predicting said second quantization width based on said amount of codes of said one screen calculated by said amount-of-codes calculating means and said target amount of codes;

coding stop means for generating and supplying a coding stop signal to said entropy coding means in response to said second control signal from said control means so as to stop coding when said amount of codes of said second coded output generated by said entropy coding means exceeds said assigned amount of codes determined by said assigned-amount-of-codes determining means; and a recording section for writing said second coded output of one screen from said entropy coding means on a recording medium when said entropy coding means completes coding of said image data of one screen.

12. A camera according to claim 11, wherein said image data includes color image data separated for individual color components.

13. A camera according to claim 11, wherein said coding stop means include means for stopping coding of a high frequency component of said image data.

* * * * *